United States Patent Office 3,214,465
Patented Oct. 26, 1965

3,214,465
ORGANIC NITROGEN COMPOUNDS CONTAINING FLUORINE AND THE SYNTHESIS THEREOF
George N. Sausen, Wilmington, Del., assignor to E. I. du Pont de Nemours and Company, Wilmington, Del., a corporation of Delaware
No Drawing. Filed June 28, 1962, Ser. No. 205,856
12 Claims. (Cl. 260—543)

This invention relates to, and has as its principal objects provision of, novel and useful compositions of matter and the preparation of the same.

The products of this invention are chemical compounds defined by the general formula $CF_3ONR^1R^2$, in which $R^1$ is fluorine or —$OCF_3$ and $R^2$ is perfluoroalkyl of up to 18 carbons or —$SO_2F$. These compounds, and $CF_3ONF_2$, are obtained by subjecting a mixture of bis(perfluoromethyl) peroxide, $CF_3OOCF_3$, and nitrogen trifluoride, tetrafluorohydrazine, or a compound of the formula $NFR^1R^3$, wherein $R_3$ is fluorine, perfluoroalkyl of up to 18 carbons or —$SO_2F$ and $R^2$ has the meaning given above, to a source of chemically activating energy. The chemically activating energy employed is either actinic radiation (ultraviolet) or thermal.

The reaction between bis(perfluoromethyl) peroxide and nitrogen trifluoride, tetrafluorohydrazine, or $NFR^1R^3$ compound, irrespective of the type of activating energy used, involves theoretically one mole of each reactant. In practice it is preferred to employ bis(perfluoromethyl) peroxide in excess of the theoretically required molar amount. At the end of the reaction the unreacted peroxide is removed and can either be reused or else discarded. The reactions are difficult to formulate schematically but as an approximation they can be represented as follows:

(1) 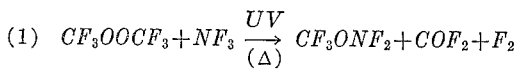

(2) 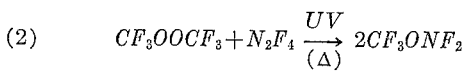

(3) 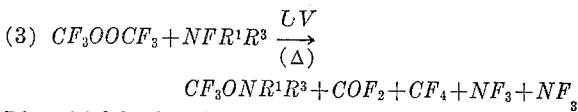

$R^1$ and $R^3$ having the meanings assigned above.

Bis(perfluoromethyl) peroxide is prepared as follows:

A 240-ml. pressure vessel constructed of a corrosion-resistant nickel-iron-molybdenum alloy, charged with 11.25 g. (0.19 g. mole) of anhydrous potassium fluoride and 2.0 g. (0.014 g. mole) of silver difluoride, was evacuated and cooled to —80° C. Thereafter there were added 45 g. (0.49 g. mole) of chlorine trifluoride and 47 g. (0.71 g. mole) of carbonyl fluoride. The mixture was heated to 200° C. for 10 hours. An autogenous pressure of 1215–1325 p.s.i. was developed. The volatile product, which had been transferred directly into a stainless steel cylinder, weighed 55 g. A sample of the product was passed through granulated charcoal and then analyzed by gas chromatography, which indicated that the mixture contained 5.6% carbonyl fluoride and 94.4% bis(trifluoromethyl) peroxide. Bis(trifluoromethyl) peroxide was isolated from the crude reaction mixture by passing it through a purification train comprised of the following:

(1) An absorption tube containing granulated anhydrous calcium chloride for removal of unreacted $ClF_3$ and by-product ClF;

(2) A gas washing bottle containing water for hydrolysis of carbonyl fluoride;

(3) A gas washing bottle containing 5% sodium hydroxide for removal of hydrogen fluoride, carbon dioxide, chlorine, and residual carbonyl fluoride;

(4) A trap cooled to —80° C. to freeze out water and to condense bis(trifluoromethyl) peroxide; and (5) A liquid nitrogen-cooled trap to prevent possible loss of bis(trifluoromethyl) peroxide (B.P. —37° C.).

The bis(trifluoromethyl) peroxide which condensed in the trap at —80° C. was transferred into the liquid nitrogen-cooled trap under reduced pressure, and the product was then finally transferred to a stainless steel storage vessel. Gas chromatographic analysis indicated that the purified product contained only a trace of carbon dioxide, and its infrared spectrum was identical with that reported for bis(trifluoromethyl) peroxide by Porter (Dissertation, "Some Chemical Properties of Trifluoromethyl Hypofluorite," University of Washington, 1956).

In addition to nitrogen trifluoride, $NF_3$, and tetrafluorohydrazine, $N_2F_4$, exemplary usable compounds (of the formula $NFR^1R^3$) are trifluoromethyl nitrogen difluoride, $CF_3$ $NF_2$; n-perfluoropropyl nitrogen difluoride, n-$C_3F_7NF_2$; perfluoroisopropyl nitrogen difluoride, $(CF_3)_2CFNF_2$; N,N-difluoroaminosulfonyl fluoride, $FSO_2NF_2$; perfluoromethoxy perfluoromethyl nitrogen fluoride, $CF_3OCF_3NF$; perfluorodecyl nitrogen difluoride, $C_{10}F_{21}NF_2$; perfluorododecyl nitrogen difluoride, $$C_{12}F_{25}NF_2$$

perfluorooctadecyl nitrogen difluoride, $C_{18}F_{37}NF_2$; N-perfluoromethoxy-N-fluoroaminosulfonyl fluoride, $$CF_3ONFSO_2F$$

and the like.

The $NFR^1R^3$ precursors can be made by well-known methods. It is noted, however, that N,N-difluoroaminosulfonyl fluoride, $FSO_2NF_2$, may be prepared as follows:

A 5-liter glass reactor, equipped with a quartz well, is evacuated and charged with 8.5 g. of tetrafluorohydrazine, $N_2F_4$, and 5.6 g. of $SO_2$. A low-pressure mercury resonance lamp is inserted into the quartz well, and the contents of the reactor are irradiated for 48.3 hours at from 20° to 30° C. The crude product obtained amounts to 12.8 g. Gas chromatographic analysis on a column packed with finely divided diatomaceous earth carrying 20% by weight of the ethyl ester of a tetrachloroundecafluorooctanoic acid shows it to contain 59% $FSO_2NF_2$, together with $N_2O$, $N_2F_2$, $N_2F_4$, $N_2$, $NF_3$, $SO_2F_2$, and $SOF_2$. N,N-difluoroaminosulfonyl fluoride of better than 99% purity is obtained as a colorless gas, B.P. —20° C., by gas chromatographic separation, using the previously described column.

In the process aspect of the invention wherein actinic light is used as the energy source, bis(perfluoromethyl) peroxide and the other reactant are conveniently mixed and the mixture is subjected to a source of ultraviolet light, e.g., a mercury vapor lamp. After reaction is complete, the products, if gaseous, are transferred to a container cooled to between —196° and —80° C., e.g., through the use of a pentane slush bath, and volatile material is removed by distillation under reduced pressure.

The irradiation is carried out at temperatures between 0° C. and up to about +100° C., most usually in the range of +20° to +50° C., for periods of time which can be as short as one to two minutes or can extend up to 120 or more hours, depending upon the size of the sample being irradiated and the efficiency of the light source. In some instances, as illustrated in Example I, below, the reaction is carried out in two steps in order to improve the yield of desired product.

As used herein, the term "ultraviolet light" refers to electromagnetic radiation of wave lengths in the range of 2500 to 4000 A. Effective sources of ultraviolet light are any of the commercially available lamps high in ultraviolet light output. Generally speaking, mercury vapor lamps are preferred because they provide a relatively intense source of ultraviolet light. Many lamps of this type are available and include low and high pressure lamps with various types of envelope. The most preferred types are those with quartz envelopes because such envelopes permit higher transmission of ultraviolet light.

Although it is desirable to carry out the reaction in vessels made of nickel or copper or alloys of these metals (with suitable provision for admission of ultraviolet light), the reaction can be conveniently carried out in quartz glass equipment, especially in laboratory-scale preparations.

In general, the light source should be as close as possible to the reaction mixture. Appropriate spacing can be accomplished either by placing the lamp immediately adjacent to a transparent wall of the reaction vessel, in a suitable well projecting into the reaction space, or by passing the reaction mixture through a tube which is exposed to ultraviolet light.

Although use of a reaction medium is not necessary, one can be used if it is desired. When such a medium is employed, it is one which is inert, i.e., unreactive toward reactants and reaction products, and is normally liquid. The amount of reaction medium can equal or exceed the combined weight of the reactants by many fold. Suitable reaction media are carbon tetrachloride, dichlorodifluoromethane, trichlorofluoromethane, 1,1,2-trichloro-1,2,2,-trifluoroethane, and the like.

In the alternative process aspect of the invention, i.e., that effecting the reaction purely thermally, a conventional pressure reactor is conveniently charged with bis(perfluoromethyl) peroxide and the selected other reactant and the charged reactor is closed and heated rapidly to between 100° and 250° C., most generally between 150° and 225° C., where it is held for from 10 minutes to 24 hours. The product, if volatile, is collected in a trap cooled either with acetone-solid carbon dioxide, liquid nitrogen, or pentane slush. The condensate is then subjected to chromatographic analysis to identify and isolate the products.

Irrespective of the chemically activating means used, the reaction is usually and, preferably, carried out under autogenous pressure. If desired, however, externally applied pressure can be used, but this has no practical advantage.

There follow some nonlimiting examples submitted to illustrate preferred aspects of invention in more detail. In these examples all pressures are autogenous unless otherwise noted. Gas chromatographic analyses were carried out on the following columns:

Column A—A 12′ column of 20% of the ethyl ester of a tetrachloroundecafluorooctanoic acid on a finely divided diatomaceous earth support, 0° C.

Column B—A 12′ column of 10% of the ethyl ester of a tetrachloroundecafluorooctanoic acid on an alumina support.

Column C—A 2′ column of 6% of ethyl N,N-dimethyloxamide on a silica gel support.

Fluorine nuclear magnetic resonance spectra were obtained at 56.4 mc./sec. with 1,2-difluorotetrachloroethane as a reference standard.

EXAMPLE I

A 12-liter nickel reactor with a calcium fluoride window was charged with 36.1 g. of $CF_3OOCF_3$ and 17.2 g. of $N_2F_4$ and the reaction mixture was irradiated with a low-pressure mercury resonance lamp for 47 hours at 25° C. The gaseous products were transferred to a 300-ml. cylinder to give a total of 50 g. of crude product. The cylinder was cooled at −126° C. (pentane slush bath) and volatile products were removed to a pressure of 1–2 mm. The residue amounted to 40.5 g. and consisted of 14% $CF_3ONF_2$, 16% $N_2F_4$ and 67% $CF_3OOCF_3$ with traces of $NF_3$ and $N_2F_2$ as judged from gas chromatographic analysis (column C).

The crude product was recharged into the reactor, 10.3 g. of $N_2F_4$ was added, and the irradiation was continued for an additional 72 hours. The crude product was collected (43.8 g.) and the volatile products were removed as before to leave 36.9 g. of crude $CF_3ONF_2$. Gas chromatographic analysis of this product showed it to contain 49% $CF_3ONF_2$, perfluoromethoxy nitrogen difluoride; 34% $CF_3OOCF_3$; 4% $N_2F_4$; and small amounts of NO, $NF_3$ and $N_2F_2$. The crude $CF_3ONF_2$ was further purified to 99% by preparative gas chromatography (column B). The purified product, a colorless gas, had an estimated boiling point of −53° C. (vapor pressure method).

*Analysis.*—Calc. for $CF_5NO$: F, 69.34; M.W., 137. Found: F, 68.38; M.W., 138 (vapor density method).

Mass spectrometric analysis of the purified $CF_3ONF_2$ showed the following principal fragments: m/e 69, $CF_3^+$ (100%); 52, $NF_2^+$ (52%); 30, $NO^+$ (29%); 47, $COF^+$ (10.5%); 33, $NF^+$ (10%); 31, $CF^+$ (4.4%); 66, $COF_2^+$ (3.4%); 50, $CF_2^+$ (2.4%); 14, $N^+$ (1.3%); 19, $F^+$ (2%); 28, $CO^+$ (1.3%); 70, $CF_3$ isotope (1.2%). Infrared analysis showed principal bands at 7.65, 8.0, and 8.15μ (C—F), 9.65μ (doublet), 11.5μ (N—F), and 13.95μ (triplet). Fluorine n-m-r showed peaks at −10, 670 c.p.s. ($NF_2$; triplet) and 0 c.p.s. ($CF_3$; triplet) in approximate area ratio of 2/3 in agreement with the structure.

EXAMPLE II

An 80 cc. "Hastelloy" C-lined pressure reactor was charged with 9 g. of $CF_3OOCF_3$ and 6.6 g. of $N_2F_4$, and the charge was heated at 195° C. for 3.5 hours. Gas chromatographic analysis of the crude product (column C) showed it to contain 22% $CF_3ONF_2$, 19% $COF_2$, 30% $CF_3OOCF_3$, 21% $N_2F_4$, 7% $CF_4$ and/or $NF_3$ and 1% NO. The $CF_3ONF_2$, perfluoromethoxy nitrogen difluoride, could be purified to 99+% purity by preparative gas chromatography as described in Example I.

EXAMPLE III

A 3-liter heat-resistant flask with a quartz insert was charged with 6.94 g. of $CF_3OOCF_3$ and 4.94 g. $CF_3NF_2$ and the flask was irradiated with a low-pressure mercury resonance lamp for 40 hours. The product was transferred to a 300-cc. cylinder to give 11.8 g. of crude material. Gas chromatographic analysis of this product (column A) showed it to contain 10% $CF_3NF(OCF_3)$, perfluoromethoxyperfluoromethyl nitrogen fluoride; 5% $CF_3N(OCF_3)_2$, bis(perfluoromethyloxy)perfluoromethylamine; 24% $CF_3OOCF_3$; 21% $COF_2$; 13% $CF_3NF_2$, perfluoromethyl nitrogen difluoride; and small amounts of more volatile components.

The crude product was purified by preparative gas chromatography (column B) to give $CF_3ONF(CF_3)$ of 98% purity as a colorless gas, B.P. −25° (est. by vapor pressure method). The molecular weight was found to be 183 by vapor density method, calcd. for $C_2F_7NO$, 187.

Infrared analysis of $CF_3ONF(CF_3)$ showed principal bands at 7.75μ, 7.95μ, 8.35μ (C—F), 9.75μ, 10.6μ, 11.1μ (N—F), and 14.9μ.

Mass spectrometric analysis showed the m/e 69 ($CF_3^+$) fragment as the most abundant (100%) with the following major fragments also present: m/e 30 ($NO^+$), 14%, 31 ($CF^+$), 3%; 50 ($CF_2^+$), 3%; 99 ($CF_3NO^+$), 3%; 47 ($OCF^+$), 2.5%; 135 ($C_2F_5O^+$), 2%; 168 ($C_3F_6NO^+$), 1.5%. The parent peak, $C_2F_7NO$, was absent, as expected.

Fluorine n-m-r analysis showed peaks at −4156 c.p.s., +107 c.p.s., and +994 c.p.s. in an area ratio of approximately 1:3:3 as required. The peaks were essentially singlets.

The bis-$OCF_3$ compound, $CF_3N(OCF_3)_2$, was identified by infrared and mass spectrometric analysis of a sample of product separated by gas chromatography (column A). Mass spectrometric analysis showed the presence of the parent peak, $C_3F_9NO_2^+$ (m/e 253); m/e 234 (parent—1F); m/e 168 ($CF_3NOCF_3^+$); m/e 99 ($CF_3NO^+$); m/e 69 ($CF_3^+$ —100%); m/e 47($OCF^+$); m/e 30 ($NO^+$). Infrared analysis showed principal absorption bands at 7.8, 8.35, and 8.5$\mu$ (C—F), 9.8$\mu$, 10.4$\mu$, 10.85$\mu$, 11.4$\mu$, and 14.6$\mu$.

EXAMPLE IV

A 150 ml. quartz tube was charged with 0.45 g. of n-$C_3F_7NF_2$ and 0.35 g. of $CF_3OOCF_3$ and the tube was irradiated with a low-pressure mercury resonance lamp for 10.6 hours. Gas chromatographic analysis (column A) showed the crude product to contain 17%

$$CF_3CF_2CF_2NF(OCF_3)$$

perfluoromethoxyperfluoropropyl nitrogen fluoride; 4% $CF_3CF_2CF_2N(OCF_3)_2$, bis(perfluoromethoxy)perfluoropropylamine; 29% $COF_2$; 25% $CF_3OOCF_3$; and 20% $C_3F_7NF_2$.

Mass spectrometric analysis of a purified sample of $CF_3CF_2CF_2NF(OCF_3)$ showed the following ions: m/e 69 ($CF_3^+$), 100%; 119 ($C_2F_5^+$), 28%; 169 ($C_3F_7^+$), 24%; 30 ($NO^+$), 20%; 268 ($C_4F_{10}NO$; parent—1F); 47 ($COF^+$); 66 ($CF_2O^+$); 28 ($CO^+$); and others.

Mass spectrometric analysis of a purified sample of $CF_3CF_2CF_2N(OCF_3)_2$ showed m/e 334 fragment ($C_5F_{12}NO_2^+$; parent—1F), 268 ($C_4F_{10}NO^+$);

$$234 \ (C_3F_8NO_2^+)$$

a trace of 353 (parent); 69 ($CF_3^+$—100%); 169 ($C_3F_7^+$); 30 ($NO^+$); 119 ($C_2F_5^+$); and others.

EXAMPLE V

A 150 ml. quartz tube was charged with 0.45 g. of $(CF_3)_2CFNF_2$ and 0.35 g. of $CF_3OOCF_3$, and the tube was irradiated with a low-pressure mercury resonance lamp for 8.8 hours. Gas chromatographic analysis (column A) showed the product to contain 5%

$$(CF_3)_2CFNF(OCF_3)$$

perfluoromethoxyperfluoroisopropyl nitrogen fluoride; about 1% $(CF_3)_2CFN(OCF_3)_2$, bis(perfluoromethoxy)-perfluoroisopropylamine; 41% $COF_2$; 14% $CF_3OOCF_3$; 15% $CF_4$; 15% $CF_4$; and 15% $(CF_3)_2CFNF_2$.

Mass spectrometric analysis of a purified sample of $(CF_3)_2CFNF(OCF_3)$ showed m/e 230 ($C_4F_8NO^+$), 169 ($C_3F_7^+$), 150 ($C_3F_6^+$), 119 ($C_2F_5^+$), 100 ($C_2F_4^+$), 69 ($CF_3^+$—100%), 66 ($OCF_2^+$), 47 ($OCF^+$), 50 ($CF_2^+$), 33 ($NF^+$), 31 ($CF^+$), 30 ($NO^+$) in agreement with the structure. Infrared analysis showed principal bands at 7.65$\mu$, 7.9$\mu$, 8.3$\mu$ (C—F), 8.95$\mu$, 9.85$\mu$, 10.2$\mu$, and 11.34$\mu$ (N—F).

EXAMPLE VI

A 150 ml. quartz tube was charged with 0.28 g. of $CF_3ONF_2$ and 0.69 g. of $CF_3OOCF_3$, and the tube was irradiated with a low-pressure mercury resonance lamp for 1.73 hours. Gas chromatographic analysis of the product (column A) showed it to contain 3%

$$(CF_3O)_2NF$$

bis(perfluoromethoxy) nitrogen fluoride; 54%

$$CF_3OOCF_3$$

12% $CF_3ONF_2$, perfluoromethoxy nitrogen difluoride; 25% $COF_2$; and small amounts of more volatile fragments.

Mass spectrometric analysis of a sample of $(CF_3O)_2NF$ purified by gas chromatography showed m/e 69 ($CF_3^+$), 66 ($OCF_2^+$), 50 ($CF_2^+$), 49 ($NOF^+$), 47 ($OCF^+$), 33 ($NF^+$), 31 ($CF^+$), 30 ($NO^+$), 28 ($CO^+$), 19 ($F^+$), 16 ($O^+$), 12 ($C^+$). Infrared analysis showed principal absorption bands at 7.75$\mu$, 8.0$\mu$, 8.55$\mu$ (C—F), and 11.2$\mu$ (N—F).

EXAMPLE VII

A 150 ml. quartz tube was charged with 0.42 g. of $CF_3OOCF_3$ and 0.17 g. of $NF_3$, and the tube was irradiated for 7.5 hours with a low-pressure mercury resonance lamp. Gas chromatographic analysis of this crude product (column C) showed it to contain 4% $CF_3ONF_2$, perfluoromethoxy nitrogen difluoride; 14% $CF_3OOCF_3$; 57% $COF_2$; and 25% $NF_3$ and/or $CF_4$.

EXAMPLE VIII

A 150 ml. quartz tube was charged with 0.41 g. of $FSO_2NF_2$ and 0.52 g. of $CF_3OOCF_3$, and the tube was irradiated with a low-pressure mercury resonance lamp for 9.35 hours. Gas chromatographic analysis of the product (column A) showed it to contain 3%

$$FSO_2NF(OCF_3)$$

38% $FSO_2NF_2$, 41% $CF_3OOCF_3$, 7% $COF_2$, and small amounts of more volatile components.

Mass spectrometric analysis of a sample of $$FSO_2NF(OCF_3)$$

purified by gas chromatography, showed m/e 69 ($CF_3^+$), 30 ($NO^+$), 83 ($SO_2F^+$), 67 ($SOF^+$), 116 ($FSO_2NF^+$), 64 ($SO_2^+$), 48 ($SO^+$), 47 ($OCF^+$), 66 ($OCF_2^+$), 28 ($CO^+$), 32 ($S^+$), 33 ($NF^+$), 31 ($CF^+$), 50 ($CF_2^+$), 51 ($SF^+$), 46 ($SN^+$), and other less abundant fragments in agreement with the $FSO_2NF(OCF_3)$, N-perfluoromethoxy-N-fluoroaminosulfonyl fluoride, structure. Infrared analysis showed principal bands at 6.7 and 7.8$\mu$ ($SO_2F$) 7.65 and 8.41$\mu$ (C—F), and in the 11$\mu$ region (N—F).

The products of this invention are useful as catalysts for the polymerization of organic compounds capable of undergoing addition polymerization. This use is illustrated in Examples A through D, which follow:

EXAMPLE A

An 80 cc. "Hastelloy" C-lined shaker tube was charged with 10 g. of tetrafluoroethylene, 30 g. of hexafluoropropylene dimer solvent, and 0.02 g. of $CF_3ONF_2$ initiator and the tube was heated with shaking at 150° for 11.75 hours. The tube was cooled and a total of 6.5 g. (65%) of white, solid polytetrafluoroethylene was separated from the solvent.

EXAMPLE B

The shaker tube of Example A was charged with 8 g. of vinylidene fluoride, 8 g. of hexafluoropropylene, 30 g. of hexafluoropropylene dimer solvent, and 0.02 g. of $CF_3ONF_2$ initiator and the tube was heated at 225° for eight hours. The tube was cooled and 2.4 g. of brown, rubbery copolymer was separated from the solvent.

EXAMPLE C

The shaker tube of Example A was charged with 10 g. of tetrafluoroethylene, 30 g. of hexafluoropropylene dimer solvent, and 0.02 g. of $CF_3NF(OCF_3)$ and the tube was heated at 150° for 12 hours. The tube was cooled and a total of 1.63 g. (16.3%) of white, solid polymer was separated from the solvent.

EXAMPLE D

The shaker tube of Example A was charged with 10 g. of tetrafluoroethylene, 30 g. of hexafluoropropylene, 30 g. of hexafluoropropylene dimer solvent, and 0.015 g. of $CF_3NF(OCF_3)$ initiator and the tube was heated at 150° for eight hours. The tube was cooled and a total of 2.91 g. of white, solid polymer was obtained.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $CF_3ONR^1R^2$ wherein $R^1$ is selected from the group consisting of fluorine and —$OCF_3$ and $R^2$ is selected from the group consisting of perfluoroalkyl of up to 18 carbons and —$SO_2F$.

2. Perfluoromethoxyperfluoromethyl nitrogen fluoride, $CF_3NF(OCF_3)$.

3. Perfluoromethoxyperfluoropropyl nitrogen fluoride, $CF_3(CF_2)_2NF(OCF_3)$.

4. Perfluoromethoxyperfluoroisopropyl nitrogen fluoride, $(CF_3)_2CFNF(OCF_3)$.

5. N-perfluoromethoxy-N-fluoroaminosulfonyl fluoride, $FSO_2NF(OCF_3)$.

6. The process which comprises reacting, at a temperature in the range of about 0–100° C., $CF_3OOCF_3$ and a compound of the group consisting of $N_2F_4$, $NF_3$ and $NFR^1R^3$ wherein $R^1$ is selected from the group consisting of fluorine and —$OCF_3$ and $R^3$ is selected from the group consisting of perfluoroalkyl of up to 18 carbons, —$SO_2F$ and fluorine under the influence of ultraviolet light.

7. The process which comprises reacting $CF_3OOCF_3$ and $CF_3NF_2$ at a temperature of about 20–50° C., under the influence of ultraviolet light.

8. The process which comprises reacting $CF_3OOCF_3$ and n-$C_3F_7NF_2$ at a temperature of about 20–50° C. under the influence of ultraviolet light.

9. The process which comprises reacting $CF_3OOCF_3$ and $(CF_3)_2CFNF_2$ at a temperature of about 20–50° C. under the influence of ultraviolet light.

10. The process which comprises reacting $CF_3OOCF_3$ and $NF_3$ at a temperature of about 20–50° C. under the influence of ultraviolet light.

11. The process which comprises reacting $CF_3OOCF_3$ and $FSO_2NF_2$ at a temperature of about 20–50° C. under the influence of ultraviolet light.

12. The process which comprises reacting $CF_3OOCF_3$ and a compound of the group consisting of $N_2F_4$, $NF_3$ and $NFR^1R^3$ wherein $R^1$ is selected from the group consisting of fluorine and —$OCF_3$ and $R^3$ is selected from the group consisting of perfluoroalkyl of up to 18 carbons, —$SO_2F$ and fluorine at a temperature of about 100–250° C.

References Cited by the Examiner

"Encyclopaedia Chimica Internationalis," vol. 6, Dec. 30, 1961, item 14820, compound No. 2.

Gervasi et al.: "J. Am. Chem. Soc.," vol. 78, pages 1679 to 1682 (1956).

LORRAINE A. WEINBERGER, *Primary Examiner.*

LEON ZITVER, *Examiner.*